(12) United States Patent
Bahar

(10) Patent No.: US 7,734,181 B2
(45) Date of Patent: Jun. 8, 2010

(54) DEVICES, SYSTEMS AND METHODS FOR AD HOC WIRELESS COMMUNICATION

(76) Inventor: Ajang Bahar, 171 Pine Valley Dr., Kitchener, Ontario (CA) N2P 2V8

( * ) Notice: Subject to any disclaimer, the term of this patent is extended or adjusted under 35 U.S.C. 154(b) by 421 days.

(21) Appl. No.: 11/766,437

(22) Filed: Jun. 21, 2007

(65) Prior Publication Data

US 2008/0247345 A1    Oct. 9, 2008

Related U.S. Application Data

(63) Continuation-in-part of application No. 11/697,812, filed on Apr. 9, 2007.

(51) Int. Cl.
*H04B 10/00* (2006.01)
*H04L 9/08* (2006.01)

(52) U.S. Cl. ............... 398/115; 398/116; 398/118; 398/130; 398/131; 398/166; 398/162; 380/278; 370/310

(58) Field of Classification Search ......... 398/106–118, 398/135–131, 162, 166; 380/278; 370/310; 369/44, 44.11
See application file for complete search history.

(56) References Cited

U.S. PATENT DOCUMENTS

| 5,073,824 | A | * | 12/1991 | Vertin ............... 348/211.2 |
| 5,666,577 | A | | 9/1997 | McIntyre et al. |
| 5,777,561 | A | | 7/1998 | Chieu et al. |
| 5,914,783 | A | | 6/1999 | Barrus |
| 5,918,024 | A | * | 6/1999 | Moon ............... 710/106 |
| 6,094,189 | A | * | 7/2000 | Quillen et al. ............... 345/158 |

(Continued)

FOREIGN PATENT DOCUMENTS

EP    1 024 626 A    8/2000

(Continued)

OTHER PUBLICATIONS

Yazaki et al: "1Gbit/s handheld file transfer system with optical wireless interface", LEOS 2006, Oct. 2006, pp. 84-85.*

(Continued)

*Primary Examiner*—Li Liu
(74) *Attorney, Agent, or Firm*—Herman & Millman

(57) ABSTRACT

The current options for wireless communication have changed the way people work and the way in which networks can be deployed. However, there remains unresolved problems in the setup and configuration of wireless communication links. Both known cellular and ad hoc wireless networking protocols and systems are deficient in that the ability for users to communicate without a priori knowledge of MAC addresses (represented by phone numbers, IP addresses and the like) is limited or may be compromised in a hostile environment. In contrast, provided by aspects of the present invention are devices, systems and methods for establishing ad hoc wireless communication between users that do not necessarily have MAC addresses and the like for one another. In some embodiments, a first user visually selects a second user and points a coherent light beam at an electronic device employed by the second user. Data specific to the first user is modulated on the coherent light beam, which can then be demodulated when the coherent light beam is received by the electronic device of the second user.

9 Claims, 8 Drawing Sheets

U.S. PATENT DOCUMENTS

| | | | |
|---|---|---|---|
| 6,097,375 A | 8/2000 | Byford | |
| 6,236,486 B1 * | 5/2001 | Nocker, IV | 398/129 |
| 6,335,685 B1 | 1/2002 | Schrott et al. | |
| 6,493,122 B1 * | 12/2002 | Degura | 398/128 |
| 6,512,507 B1 | 1/2003 | Furihata et al. | |
| 6,563,619 B1 * | 5/2003 | Hirayama et al. | 398/121 |
| 6,714,800 B2 | 3/2004 | Johnson et al. | |
| 6,729,731 B2 | 5/2004 | Gnanamgari et al. | |
| 6,952,198 B2 | 10/2005 | Hansen | |
| 6,982,821 B2 | 1/2006 | Hecht | |
| 7,072,591 B1 | 7/2006 | Smith | |
| 7,110,678 B2 | 9/2006 | Willebrand et al. | |
| 7,162,157 B2 | 1/2007 | Paoli | |
| 7,162,158 B2 | 1/2007 | Byers et al. | |
| 7,162,159 B2 | 1/2007 | Oettinger et al. | |
| 7,170,863 B1 | 1/2007 | Denman et al. | |
| 7,171,126 B2 | 1/2007 | Cicchiello et al. | |
| 7,187,687 B1 | 3/2007 | Davis et al. | |
| 7,199,719 B2 | 4/2007 | Steinberg | |
| 7,221,874 B2 * | 5/2007 | Tegge et al. | 398/119 |
| 7,330,662 B2 | 2/2008 | Zimmerman | |
| 7,336,903 B2 | 2/2008 | Iwamoto et al. | |
| 7,388,491 B2 | 6/2008 | Chand et al. | |
| 2002/0149822 A1 * | 10/2002 | Stroud | 359/154 |
| 2003/0167207 A1 | 9/2003 | Berardi et al. | |
| 2004/0161246 A1 * | 8/2004 | Matsushita et al. | 398/187 |
| 2005/0061875 A1 | 3/2005 | Zai et al. | |
| 2005/0071733 A1 * | 3/2005 | Fukae et al. | 714/776 |
| 2005/0276610 A1 * | 12/2005 | Hirayama | 398/140 |
| 2006/0018661 A1 * | 1/2006 | Green et al. | 398/128 |
| 2006/0062099 A1 * | 3/2006 | Yazaki et al. | 369/44.11 |
| 2006/0127097 A1 | 6/2006 | Obrea et al. | |
| 2006/0136972 A1 * | 6/2006 | Metzger et al. | 725/105 |
| 2006/0238306 A1 | 10/2006 | Loving | |
| 2007/0025551 A1 * | 2/2007 | Harrison et al. | 380/256 |

FOREIGN PATENT DOCUMENTS

| | | | |
|---|---|---|---|
| EP | 1024626 | * | 8/2000 |
| EP | 1 315 133 A | | 5/2003 |
| GB | 2 427 101 A | | 12/2006 |
| GB | 2 427 317 A | | 12/2006 |
| WO | WO 03/075491 A | | 9/2003 |

OTHER PUBLICATIONS

Lazer Runner, "A Complete Guide to How Laser Tag Equipment Works . . . ", http://www.lazerrunner.com/mod.php?mod=userpage&menu=13&page_id=30, date unknown.

Sona Optical Wireless, "Technology", www.fsona.com/technology.php, date unknown.

Sona Optical Wireless "Technology: FSO Primer", www.fsona.com/technology.php?sec=fso_primer, date unknown.

* cited by examiner

US 7,734,181 B2

DEVICES, SYSTEMS AND METHODS FOR AD HOC WIRELESS COMMUNICATION

This application is a Continuation-In-Part of U.S. patent application Ser. No. 11/697,812, which is hereby incorporated by reference.

FIELD OF THE INVENTION

The invention relates to wireless communication, and in particular to devices, systems and methods for ad hoc wireless communication.

BACKGROUND OF THE INVENTION

The current options for wireless communication have changed the way people work and the way in which networks can be deployed. However there remains unresolved problems in the setup and configuration of wireless communication links. Amongst such problems is the need to determine the respective Media Access Control (MAC) address of a receiver or a group of receivers before communication can actually begin.

In a cellular wireless communication environment the MAC address is typically linked to a phone number that must be known by a transmitter before a wireless communication link can be established between users. This is problematic for at least two reasons. First, two users may be within visual proximity of one another, yet not able to communicate phone numbers to one another. For example, this may occur as a result of environmental factors (e.g. excessive noise) or social factors (e.g. they are in a meeting where speaking out loud would be disruptive) or they are simply not close enough to one another to effectively exchange phone numbers despite being able to see one another. Second, only one of the users may be able to see the other and wishes to make contact but does not have the requisite phone number and is otherwise unable to make contact with the other user who is unaware of the user looking to make contact. In such scenarios, a wireless communication link is likely impossible using a cellular network because there is little chance that the requisite phone number can be determined.

In ad hoc wireless networking, the issue of security arises as a more significant factor. For example, for users employing a Bluetooth™ device, a first individual wishing to initiate a wireless communication link with a second individual is forced to transmit a broadcast message to poll all of the users within the proximity of the first individual in order to establish a link with the specific second individual if the address of the second individual is not known. According to the Bluetooth™ standard, the broadcast message from the first transmitter (master unit) is in the form of an inquiry and multiple page messages to which slave units may respond with respective MAC addresses. The MAC address or other identification of the electronic device belonging to the second individual electronic device may not provide enough information to allow the first individual to distinguish the electronic device belonging to the second individual from all other user devices in the area. As such, the first individual may undesirably establish a link with another user and/or fail to establish the link with the second individual with which communication is truly desired.

It may also be undesirable to send the broadcast message in the first place. The broadcast message provides the MAC address of the device employed by the first individual to all users in the area proximate to the first individual. In a public or hostile environment, the broadcasting of the MAC address may compromise the security of the first individual because the MAC address can be used to electronically compromise the device employed by the first individual or allow others to intercept what might be private communications between the first and second individuals over a Bluetooth™ link.

SUMMARY OF THE INVENTION

According to an aspect of an embodiment of the invention, there is provided a device for remotely establishing data communication between two electronic devices, the device including: a device interface, the device interface having a first output and a first input, wherein the first output is connectable to a camera mount controller to provide a control signal for directing the operation of the camera mount controller, and wherein the first input is connectable to receive a data input from a remote user; an optical modem for transmitting data on a coherent light beam; a memory for storing data within the device; and a controller connectable to the optical modem, the memory and the data interface, the controller having computer program product including computer usable program code for transmitting data from the device to a second device, the computer usable program code including program instructions for: parsing signals received by the device through the device interface; determining whether a signal received is for directing the operation of the camera mount controller or initiating communication with a second device; if the signal received is for directing the operation of the camera mount controller, transmitting a control signal for directing the operation of a camera mount controller; and if the signal received is for initiating communication with the second device, retrieving data specific to the device from the memory, modulating the selected data onto a coherent light beam with the optical modem.

In some embodiments, the computer usable program code further includes program instructions for: initially transmitting an unmodulated coherent light beam for a first duration to allow a user to aim the coherent light at the second device; and transmitting the selected data from the optical modem after the first duration.

In some embodiments, the device includes a camera, the camera having a network connection to provide real-time video data to a user through the network connection. In some more specific embodiments, the camera is further connectable to receive data signals from the network connection. In yet even more specific embodiments, the network connection is one of an ethernet connection, a USB (Universal Serial Bus) port and a wireless modem. In other embodiments, the camera is integral with the device and internally connectable to the device interface.

In some embodiments, the device includes a camera mount controller serving as an interface for a mechanical system for positioning the device so as to direct the field of view of the camera and a coherent light beam transmitted from the optical modem, wherein the path of the coherent light beam represents a data path between the device and a target selected by the user. In some more specific embodiments, the device includes a movable camera mount serving as the mechanical system for positioning the device.

In some embodiments, the selected data modulated onto the coherent light beam is one of a text message, a phone number, an email address, a Media access Control (MAC) address suitable for a wireless communication link and a wireless session identifier.

According to an aspect of an embodiment of the invention, there is provided a system for remotely establishing data communication between two electronic devices, the system including; a device having a device interface, the device interface having a first output and a first input, wherein the first output is connectable to a camera mount controller to provide a control signal for directing the operation of the camera mount controller, and wherein the first input is connectable to receive a data input from a remote user; an optical modem for transmitting data on a coherent light beam; a memory for storing data within the device; and a controller connectable to the optical modem, the memory and the data interface, the controller having computer program product including computer usable program code for transmitting data from the device to a second device, the computer usable program code including program instructions for: parsing signals received by the device through the device interface; determining whether a signal received is for directing the operation of the camera mount controller or initiating communication with a second device; if the signal received is for directing the operation of the camera mount controller, transmitting a control signal for directing the operation of a camera mount controller; and if the signal received is for initiating communication with the second device, retrieving data specific to the device from the memory, modulating the selected data onto a coherent light beam with the optical modem.

In some embodiments, the system also includes a user device remotely connected to the device through a data network, the user device having a display for displaying realtime video data captured by a camera associated with the device, and the user device having an interface enabling a user to control the operation of at least the device remotely through the data network. In more specific embodiments, the data network includes at least one of the internet, a private data network, a wireless network, and an optical fiber data network.

According to an aspect of an embodiment of the invention, there is provided a device including: a coherent light receiver for receiving coherent light from a second device; a wireless modem suitable for transmitting data over a radio communication link; a controller connectable to the coherent light receiver and the wireless modem, the controller having computer program product including computer usable program code for receiving data through the coherent light receiver and communicating with other devices using the wireless modem, the computer usable program code including program instructions for: determining whether the light is unmodulated or modulated; if the light is modulated, demodulating the modulated light to recover the data modulated thereon; deciphering the data to determine an intended purpose; and transmitting the data over a radio communication link using the wireless modem.

In some embodiments, upon deciphering the data the intended purpose is determined to be a request for information and the computer usable program code having further instructions for attempting to provide the requested data. In some more specific embodiments, attempting to provide the requested data includes searching a local database to find the data and transmitting the information to the requester using the wireless modem. In other embodiments, attempting to provide the requested data includes transmitting a signal to a remote server using the wireless modem, the signal representing a request for information to be transmitted to the requester directly.

In yet other embodiments, upon deciphering the data the intended purpose is determined to be a request for at least one of a protected article or data and the computer usable program code includes program instructions for validating the requester. In some embodiments, the program instructions for validating the requester comprise: parsing the demodulated data for an authentication key; determining if the authentication key is valid; and if the authentication key is valid, providing the requester with the requested information or access to the article.

In some more specific embodiments, the device includes a lock box for storing an article, the lock box having a lockable door, and the lock box connectable to the controller for controlling the lockable door. In some embodiments, the device includes a user interface for entering an access code or password in order to open the lockable door, the user interface connected to the controller, the controller having computer usable program code having program instructions for determining if an entered accessed code or password is valid; and if valid, sending a signal to the lock box to unlock the lockable door. In some embodiments, the access code or password is provided to a requester over a radio communication link using the wireless modem if the requester has a valid authentication key and has transmitted said key to the device using a modulated coherent light beam.

Other aspects and features of the present invention will become apparent to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION OF THE INVENTION

Figure 1:
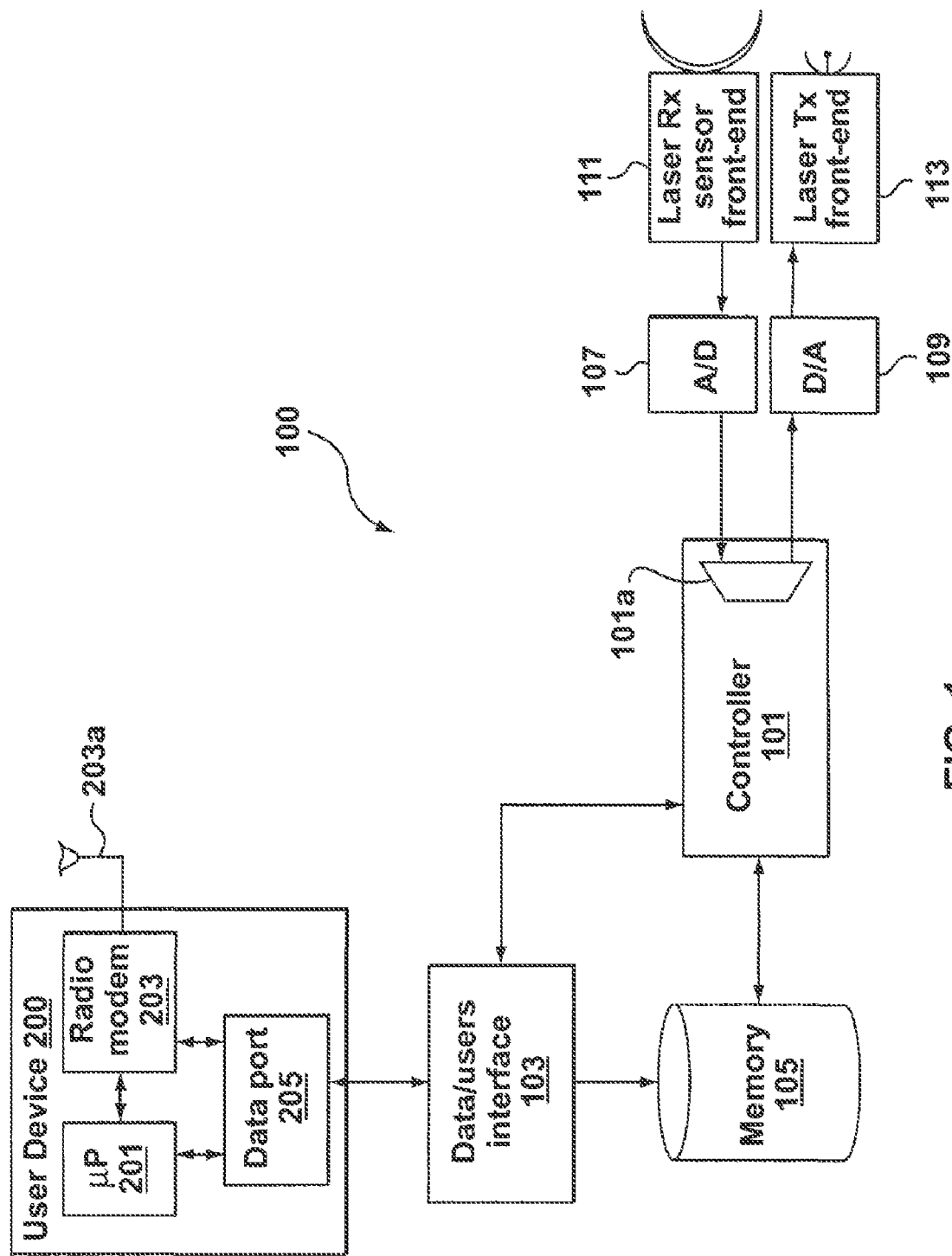
FIG. 1 is a schematic view of a device for transmitting data over a coherent light beam in accordance with the invention in combination with a user device.

The current options for wireless communication have changed the way people work and the way in which networks can be deployed. However, there remains unresolved problems in the setup and configuration of wireless communication links. Amongst such problems is the need to determine the respective Media Access Control (MAC) address of a receiver or a group of receivers before communication can actually begin. Both known cellular and ad hoc wireless networking protocols and systems are deficient in that the ability for users to communicate without a priori knowledge of MAC addresses (represented by phone numbers, IP addresses and the like) is limited or may be compromised in a hostile environment.

Provided by aspects of the present invention are devices, systems and methods for establishing ad hoc wireless communication between users that do not necessarily have MAC addresses and the like for one another. In some embodiments, a first user visually selects a second user and points a coherent light beam at an electronic device employed by the second user. Data specific to the first user is modulated on the coherent light beam, which can then be demodulated when the coherent light beam is received by the electronic device of the second user. In some embodiments, the coherent light beam is visible, such as for example, as generated by a laser source.

Data communication often starts by identifying "who" or "what" to engage in communication with. In some embodiments, in accordance with aspects of the invention, information with respect to "who" or "what" to engage in communication with is gathered through line of sight and used as identification for the purpose of ad hoc wireless communication.

The data specific to the first user can be one of a phone number, an IP address, an email address, a link key for a Bluetooth™ session and a MAC address, or similar information that may enable the second user to contact the first user using a wireless communication link. For example, the data received by the second user may be used to establish a radio wireless communication link on a cellular wireless network or an ad hoc Local Area Network (LAN) that, for example, employs the Bluetooth™ standard.

Additionally and/or alternatively, users may not even be in the same location. For example, a user may be provided with a real-time video stream from a particular location (e.g. a conference room, a cafe, a park, etc.) and in turn may want to establish contact with someone having a device suitable for electronic communication in that location. The prior art does not enable remote users to establish contact in such a situation unless the remote user has the contact information or MAC address of the target user already. In contrast, provided in accordance with aspects of the invention is a camera system adapted to enable a remote user, receiving a real-time video stream from the camera system, to establish communication with the target user, whose image is captured by the camera system and whose contact information or MAC address is unknown to the remote user, using a modulated coherent light beam that can be specifically directed at a suitable device utilized by a respective target user.

Additionally and/or alternatively, aspects of the invention provide an authentication system that may be used for lock boxes and the like. Lock boxes are often used in the real estate market to store a copy of a key for a house that is up for sale. In some cases, the lock box has a combination lock, requiring real estate agents (and the like) to remember to get the combination before leaving the office. However, it is easy to forget a combination for a particular lock box, especially when several houses a day are visited. In accordance with aspects of the present invention, there is a provided a lock box that is adapted to receive a modulated coherent light beam from a user and utilize a radio communication link to provide the user with a determination about whether or not the user is permitted to access the lock box. A valid (authorized) user will have transmitted an authentication key specific to the user on the modulated coherent light beam, whereas an unauthorized user will not have a valid authentication key. In some embodiments an implementation of an authentication system and method for validating users is provided on a remote server with which the lock box communicates. Additionally and/or alternatively, the implementation of the authentication system is provided within the lock box itself. A very specific example embodiment is described in further detail below with reference to FIGS. 5 and 6.

Additionally and/or alternatively, the authentication system can be further adapted to provide information to users. For example, in a retail environment, a user may wish to obtain more information about a particular product (e.g. an appliance such as a refrigerator). In accordance with aspects of the invention a product can be provided with a device for transferring information about the product to a user. In some embodiments, the device includes a receiver for receiving and demodulating a modulated coherent light beam from a user and a radio modem for sending a request to a database system containing information about the product the device is associated with over a radio communication link. In such embodiments, the modulated coherent light beam contains contact information for the user, such as, for example and without limitation, an email address, a phone number, a MAC address, etc. The database system may respond automatically with an email, a text message, a voice message or the like providing the details of the product to the user. Additionally and/or alternatively, product information may be stored locally and communicated to a user using a radio communication link after the user initially transmits a request, containing contact information (e.g. a link key), using a modulated coherent light beam. A very specific example embodiment is described in further detail below with reference to FIG. 7.

The fact that the light is coherent ensures that the light and data modulated thereon is transmitted between two points only and is not broadcast in a spherical wave the way noncoherent light propagates. The fact that it is visible allows users to determine with some degree of accuracy the intended target/recipient of the transmitted information. Eavesdroppers or others that may intercept the signal are easily identified as being in the direct path of the coherent and visible light. As such, the first or second user may take precautions to avoid contact with such third parties. In other words, the "who" or "what" to engage in wireless communication with is determined through the line of sight between users in order to establish ad hoc wireless communication.

The data modulated onto the coherent light beam is one of a "text message", a phone number, an email address, a Media Access Control (MAC) address suitable for a wireless communication link and a wireless session identifier. For example, according to the Bluetooth™ standard, the wireless session identifier is a link key. Moreover, those skilled in the art will appreciate that a text message may contain a suitable combination of letters, digits, characters and symbols from one or more language alphabets.

Aspects of the invention may be embodied in a number of forms. For example, various aspects of the invention can be embodied in a suitable combination of hardware, software and firmware. In particular, some embodiments include, without limitation, entirely hardware, entirely software, entirely firmware or some suitable combination of hardware, software and firmware. In a particular embodiment, the invention is implemented in a combination of hardware and firmware, which includes, but is not limited to firmware, resident software, microcode and the like.

Additionally and/or alternatively, aspects of the invention can be embodied in the form of a computer program product that is accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by, or in connection with, the instruction execution system, apparatus, or device.

A computer-readable medium can be an electronic, magnetic, optical, electromagnetic, infrared, or semiconductor system (or apparatus or device) or a propagation medium. Examples of a computer-readable medium include a semiconductor and/or solid-state memory, magnetic tape, a removable computer diskette, a random access memory (RAM), a read-only memory (ROM), a rigid magnetic disk and an optical disk. Current examples of optical disks include, without limitation, compact disk—read only memory (CD-ROM), compact disk—read/write (CD-R/W) and DVD.

In accordance with aspects of the invention, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Additionally and/or alternatively, in accordance with aspects of the invention, a data processing system suitable for storing and/or executing program code will include at least one processor integrated with memory elements through a system bus.

Input/output (i.e. I/O devices)—including but not limited to keyboards, touch-pads, displays, pointing devices, etc.—can be coupled to the system either directly or through intervening I/O controllers.

Network adapters may also be coupled to the system to enable communication between multiple data processing systems, remote printers, or storage devices through intervening private or public networks. Modems, cable modems and Ethernet cards are just a few of the currently available types of network adapters.

Referring to FIG. 1, shown is a first system view of a device 100 for transmitting data over a coherent light beam according to aspects of the invention, which is coupled to a user device 200. The device 100 includes a controller 101 having a multiplexer (MUX) 101a. The MUX 101a is connected to a transmission branch and a reception branch arranged in parallel to one another. The transmission branch includes digital-to-analog (D/A) converter 109 connected in series between the MUX 101a and a laser signal transmitter (Tx) front end 113. The reception branch includes an analog-to-digital converter 107 connected in series between the MUX 101a and a laser signal receiver (Rx) sensor front end 111. The components of the transmission branch and the reception branch may be considered together as an optical modem suitable for transmitting and receiving optical signals without a fiber optical cable. In some embodiments, the optical modem is an off-the-shelf component that may be integrated with an embodiment of the device 100.

The device 100 also includes a memory module 105 and a data/user interface module 103. The memory module 105 is connected to both the controller 101 and the data/user interface module 103 and serves the purpose of storing local data and computer usable program code. In some embodiments, the computer usable program code includes program instructions for: sensing a user initiated session through the data interface; initially transmitting an unmodulated coherent light beam for a first duration; selecting data specific to the device from the memory; modulating the selected data onto a coherent light beam with the optical modem; and transmitting the selected data from the optical modem after the first duration.

Additionally and/or alternatively, the computer usable program code also includes instructions for determining whether the light is unmodulated or modulated. If the light is modulated, demodulating the modulated light to recover the data modulated thereon; and generating a local signal after demodulating the modulated light. In some very specific embodiments, the local signal includes at least one of a text message, an email, an audible sound a vibration and a visual indicator.

The data/user interface 103 is also connected to the controller 101 and is provided for transmitting and receiving data either directly from a user or from another electronic device connectable to the device 100. In some embodiments, the device 100 is connectable to electronic devices, such as for example only, and without limitation, cell phones, personal digital assistants (PDAs), personal computers and the like.

In some embodiments, the coherent light is visible and in others the coherent light is not visible. As such, when the coherent light is not visible the device 100 is optionally provided with a view finder (not shown) for aiming the coherent light towards a receiving device. In some embodiments, the device 100 also includes an output (not specifically shown) that is manipulatable by a user for pointing the coherent light beam at a user selected target. Moreover, the device may also be integrated into a rigid housing. In order to be considered "hand-size", in some embodiments, the rigid housing is approximately 1 to 4 inches in length so as to fit in the hand of an average person.

In some embodiments, the first duration is in the range of 1-3 seconds, so as to allow a user to line up and select the target using the unmodulated coherent light beam transmitted from the laser Tx front end 113.

In some more specific embodiments, the data/user interface 103 is connectable to a user input device (not specifically shown). For example, and without limitation, the user input device includes one of a pressure sensor, a push-button, a toggle switch, a touch screen, a key pad or a keyboard. In such embodiments, the computer program code stored in the memory 105 has further instructions for: sensing a first input corresponding to a first signal to transmit the unmodulated coherent light beam for the first duration; and sensing a second input corresponding to a second signal to transmit the modulated coherent light beam after the first duration. In some more specific embodiments, the second input is an elongated version of the first input, such that the first signal is converted to the second signal simply by having the user maintain pressure on the user input device.

The user device 200 includes a controller (processor) 201, a data port 205 and radio modem 203 that are each connected to one another. The radio modem 203 also includes an antenna 203a. The data port 205 is connectable to the data/user interface 103 of the device 100.

The user device 200 may be at least one of a notebook computer, a cell phone, a personal digital assistant and a personal data communication device, each having an independent wireless modem (radio modem 203) suitable for establishing a radio communication link. Accordingly, in such embodiments, the computer usable program code further includes program instructions for: transmitting a message through the data interface to initiate a wireless communication session using the data demodulated from a modulated light signal on the independent wireless modem.

Additionally and/or alternatively, the device 100 and the user device 200 may be integrated with one another so as to provide the device 100 with access to a wireless modem (radio modem 203) suitable for establishing a radio communication link. Accordingly, in such embodiments, the computer usable program code further includes program instructions for initiating a wireless communication session using the data demodulated from a modulated light signal on the wireless modem. Moreover, in such embodiments, the radio communication link is preferably within at least one of a cellular network and an ad hoc wireless network.

In operation, the device 100, controlled by a first user, is used to transmit data wirelessly between first and second user devices without the need for a priori information relating to the MAC address (or the like) of the second user device. The first user directs the coherent and visible light from the device 100 to a second similarly configured device belonging to a second user. Initially, coherent and visible light is unmodulated for a first duration which is regulated internally by the device 100. The first duration provides the first user time to direct or aim the coherent and visible light towards the second similarly configured device. After the first duration, data specific to the device 100 is modulated on the coherent and visible light and transmitted to the second similarly configured device so long as the first user maintains the positioning of the device 100 established during the first duration.

This method of transferring data is effective because the light is both coherent and visible enabling the first user to identify the second user along a line of sight. The fact that the light is coherent ensures that the light and data modulated thereon is transmitted between two points only and is not broadcast in a spherical wave the way noncoherent light propagates. The fact that it is visible allows users to determine with some degree of accuracy the intended target/recipient of the information. Eavesdroppers or others that may intercept the signal are easily identified as being in the direct path of the coherent and visible light. As such, the first or second user may take precautions to avoid contact with such third parties. In other words, the "who" or "what" to engage in wireless communication with is determined through the line of sight between users in order to establish ad hoc wireless communication.

Additionally and/or alternatively, the first user may direct the coherent and visible light towards a target device used to identify packages, boxes, containers, shelves or the like. Such a device would be similar to a second user device except that it would merely serve as a beacon identifying items in the container or location, and would not be used by a second user. In such embodiments, the memory of such a device may be updated through control software on the first user device.

Moreover, while the above operation included the use of coherent and visible light, those skilled in the art would appreciate that an embodiment employing coherent and non-visible light is possible and within the scope of the following claims. In such embodiments, a device according to aspects of the invention includes an optional view finder to help a user aim the coherent and non-visible light towards a receiving device. However, the view finder is not required in all such embodiments. Additionally and/or alternatively, the device may include a LED that is turned on to emit light when coherent light from another similarly configured device is received by the device. In such embodiments, the LED serves the purpose, inter alia, of alerting one of the two users that the coherent light has been received.

Figure 2:
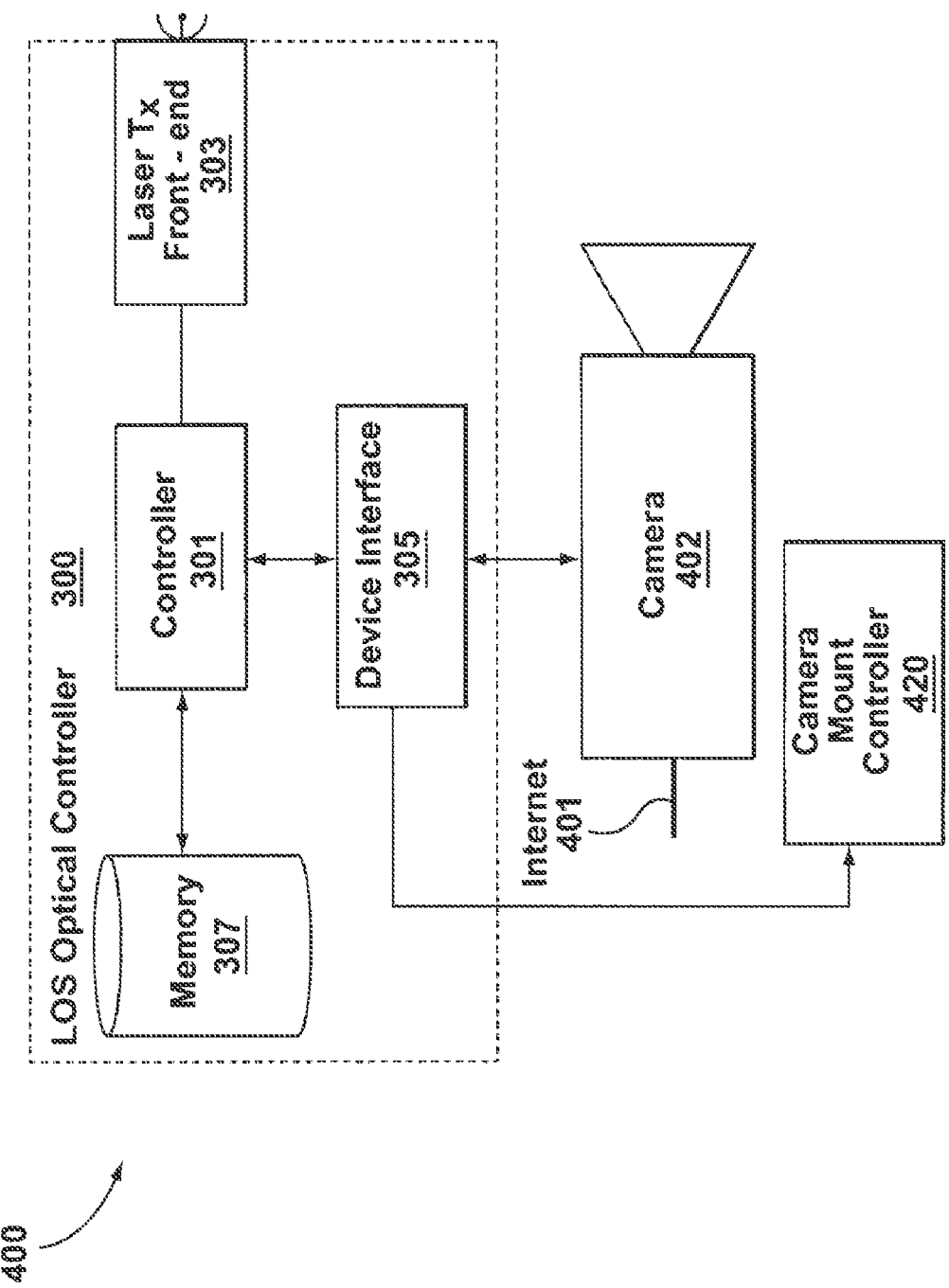
FIG. 2 is a schematic view of a camera system adapted in accordance with aspects of the invention so as to enable remote data communication.

FIG. 2 is a schematic view of a camera system 400 adapted in accordance with aspects of the invention so as to enable remote data communication. Those skilled in the art will appreciate that the camera system 400 may be supported by a suitable combination of hardware, software and firmware, in addition to mechanical structures, mechanisms, controllers and packaging. However, only those elements required to describe specific aspects of the invention have been illustrated in FIG. 2. Specifically, the camera system 400 includes a Line-Of-Sight (LOS) optical controller 300, a camera 402, and a camera mount controller 420.

In the specific embodiment shown in FIG. 2, the camera system 400 is externally connected to the internet through an internet connection 401 included in the camera 402. The internet connection 401 may include, for example and without limitation, an ethernet connection, a USB port, a wireless modem, and the like. Additionally and/or alternatively, the internet connection 401 may be provided directly to the LOS optical controller 300, the camera mount controller 420 or to an independent camera system modem (not shown) arranged to provide data connections to a suitable combination of the components in the camera system 400. The camera 402 is a camera suitable for capturing and transmitting video data in real time to a remote user.

The camera mount controller 420 is primarily a mechanical controller for positioning and directing the orientation of the camera 402 and the LOS optical controller 300. Those skilled in the art will appreciate that the camera mount controller 420 will include a suitable combination and arrangement of mechanical devices and structural elements.

The LOS optical controller 300 includes a device interface 305, a controller 301, a memory unit 307 and a laser transmit front end 303. The LOS optical controller 300 is connected to the camera 402 through the device interface 305. Specifically, the device interface 305 is arranged to accept a portion of a signal delivered to the camera 402 via the internet connection 401. In some embodiments, a signal provided to the camera system 400 contains information for both the camera 402 and the LOS optical controller 300. Accordingly, the signal can be first received at either the camera 402 or the LOS optical controller 300, de-multiplexed to separate the information for each, and the information that is not utilized locally can be passed to either the camera 402 or the LOS optical controller 300 as is required. In some embodiments, data is not sent to the camera 402 through a data connection (e.g. from the internet or private network). For example, the LOS optical controller 300 can be provided as an add-on device that may be arranged with a conventional video camera that does not have data communication functionality, and in such cases, the camera does not receive any data provided via the internet or otherwise. As such, the internet connection can be provided to the LOS optical controller 300 or to another independent modem provided with the camera system 400. Those skilled in the art will appreciate that there are numerous methods of handling the data communication amongst the components of the camera system 400, and the camera system depicted in FIG. 2 is but one example.

The device interface 305 is coupled to the camera mount controller 420 so as to provide control signals thereto and optionally receive feedback signals therefrom. Again, the function of the camera mount controller 420 is to provide a mechanical system for positioning the camera system 400 so as to direct the field of view of the camera 402 and an associated LOS data path (modulated coherent light beam) 350 of the LOS optical controller 300.

The device interface 305 is also coupled to the controller 301, which is in turn coupled to the memory unit 307 and the laser transmit front end 303. The memory unit 307 provides memory for storing data locally. For example, the camera system 400 is provided with instructions and communication data (e.g. user identification, IP addresses, phone numbers, email addresses, etc.) that are utilized during the operation of the LOS optical controller 300. The controller 301 provides communication data to the laser transmit front-end 303 where it is modulated onto a coherent laser light beam and directed to a specific target in accordance with aspects of the invention.

Figure 3:
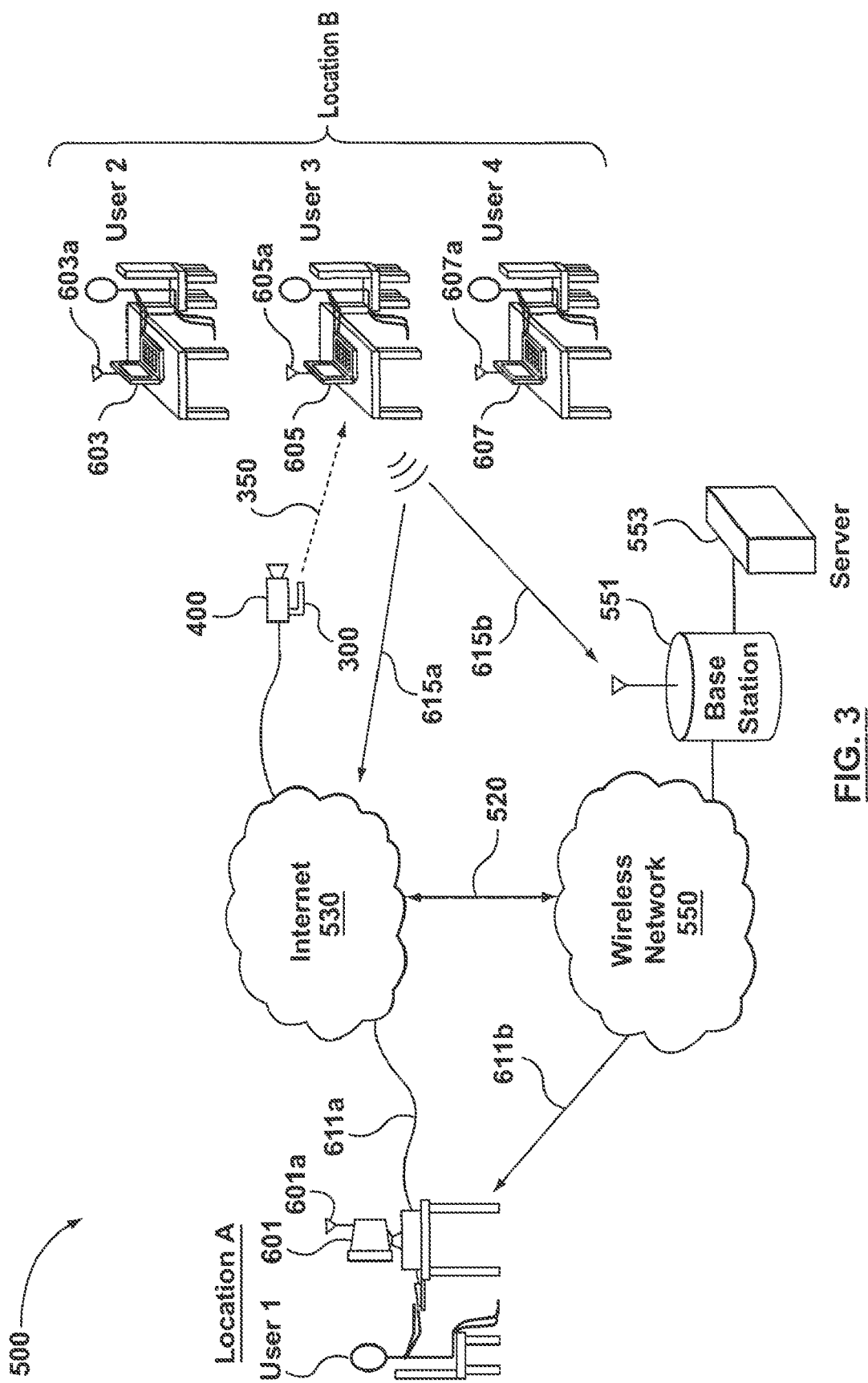
FIG. 3 is a schematic view of a communication system provided in accordance with aspects of the invention utilizing the camera system of FIG. 2.

FIG. 3 is a schematic view of a communication system 500 utilizing the camera system 400 shown in FIG. 2. The communication system 500 depicted in FIG. 3 is a simplified example provided in order to illustrate aspects of the invention. Accordingly, those skilled in the art will appreciate that various forms and configurations of communication systems may include aspects of the invention as defined by the claim and that the communication system 500 shown in FIG. 3 does not restrict the scope of the claims in any way.

The communication system 500 shown in FIG. 3 generally includes access to the internet 530 and access to a wireless network 550 (e.g. a cellular wireless network). In some embodiments, the internet 530 and the wireless network 550 may be connected by a data link 520. In such embodiments, the internet 530 and the wireless network 550 may be difficult to distinguish from one another because there may not be a clear separation between the two. The communication system also includes a number of user devices 601, 603, 605 and 607. Each user device 601, 603, 605 and 607 has a corresponding a wireless modem 601a, 603a, 605a and 607a, respectively.

The user device 601 is located at Location A and includes, for example only, a physical data connection 611a to the internet 530, which may be provided in the form of an ethernet connection, a cable modem connection, a telephone line dial-up connection 611a and the like. The user device 601, by way of the physical data connection and the internet 520 is connected to the camera system 400. The user device 601, by way of the wireless modem 601a, is also enabled to receive data from the wireless network 550 over wireless data link 611b. The camera system 400 is directed towards the users User 2, User 3 and User 4 operating corresponding user devices 603, 605 and 607, respectively, which are located at Location B. The communication system 500 also includes a base station 551 and a server 553 associated with the wireless network 550 that are near Location B. Although the server 553 is co-located with the base station 551 in FIG. 3, those skilled in the art will appreciate that the server 553 may be located at another location and operably connected to the wireless network 550 or internet 530.

In operation, the user User 1 operating user device 601 receives real-time video captured by the camera system 400 of Location B. The camera mount controller 420 is operable to direct the camera 402 and the LOS optical controller 300 as desired by the user User 1 so that the real-time video captured contains the field of view (images, angles, focus, etc.) of Location B desired by the user User 1. The user User 1 may not know any of the users User 2, User 3 and User 4 or their respective contact information, but may nevertheless wish to initiate communication with a specific one of the users User 2, User 3 and User 4. As noted above, the user User 1 may wish to initiate this communication without alerting other users at Location B (or elsewhere) that communication is desired between the user User 1 and a specific one of the users User 2, User 3 and User 4. By utilizing the camera system 400 remotely over the internet (or other data transfer network), the user User 1 is able to direct a beam of modulated coherent light 350 at a specific one of the users User 2, User 3 and User 4. The beam of coherent light 350 contains data specific to the device 601 or the user User 1, as described above with reference to FIG. 1. Again the user device to which the coherent light is directed must be configured to receive the modulated coherent light beam and respond accordingly.

For example only, FIG. 3 shows that the beam of modulated coherent light 350 is directed at the user device 605 associated with the user User 3. Once the beam of modulated coherent light 350 is demodulated and decoded by the user device 605 a message is provided to the user User 3 that provides the user User 3 with the option to reciprocate communication. Reciprocation of communication can be accomplished in a number of ways. For example the user User 3 can employ the use of data link 615a from the user device 605 to the internet 530 to respond to the user User 1. Additionally and/or alternatively, the user User 3 can employ the use of wireless data link 615b from the user device 605 to the base station 551 to respond to the user User 1. Again, this method of transferring data is effective because the light is both coherent and visible enabling the first user to identify the second user along a line of sight. The fact that the light is coherent ensures that the light and data modulated thereon is transmitted between two points only and is not broadcast in a spherical wave the way noncoherent light propagates. The fact that it is visible allows users to determine with some degree of accuracy the intended target/recipient of the transmitted information. Eavesdroppers or others that may intercept the signal are easily identified as being in the direct path of the coherent and visible light. As such, the first or second user may take precautions to avoid contact with such third parties. In other words, the "who" or "what" to engage in wireless communication with is determined through the line of sight between users in order to establish ad hoc wireless communication.

Figure 4A:
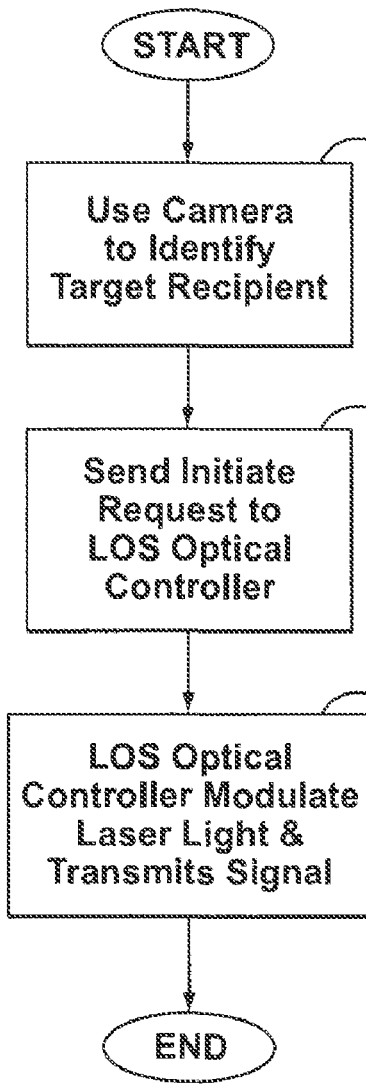
FIG. 4A is a flow chart illustrating method steps for initiating contact in a communication system, such as in FIG. 3, according to aspects of the invention.

FIG. 4A is a flow chart illustrating method steps for initiating contact in a communication system, such as in FIG. 3, according to aspects of the invention. Starting at step 4A-1 the method includes utilizing a camera system (e.g. camera system 400) to identify a target recipient that is in a different location. Those skilled in the art will appreciate that the target recipient identified must be using a device, provided in accordance with aspects of the invention, that is operable to receive and demodulate data transmitted on a coherent light beam. Step 4A-2 of the method includes sending a request to initiate contact to a LOS optical controller provided in accordance with aspects of the invention in a camera system 400. Subsequently, step 4A-3 of the method includes the LOS optical controller modulating and transmitting coherent light (laser light) towards a target recipient. For example, the transmission data specific to the first user may be a text message, a phone number, an email address, a Media Access Control (MAC) address suitable for a wireless communication link and a wireless session identifier. If Bluetooth™ is the standard employed by a radio modem included with the device, the wireless session identifier is a link key which is used to identify a specific session, without having to negotiate a session between first and second users.

Figure 4B:
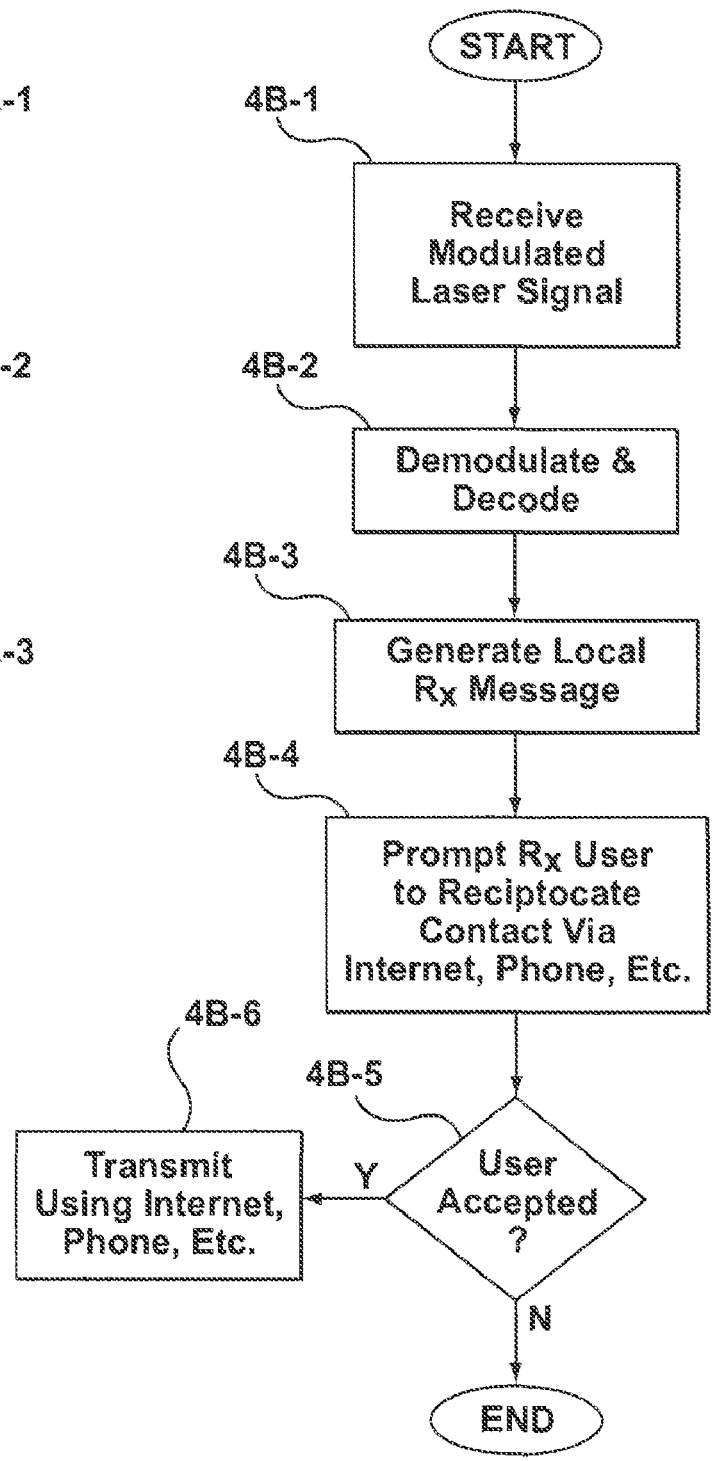
FIG. 4B is a flow chart illustrating method steps for reciprocating contact in a communication system, such as in FIG. 3, according to aspects of the invention.

FIG. 4B is a flow chart illustrating method steps for reciprocating contact in a communication system, such as in FIG. 3, according to aspects of the invention. Starting at step 4B-1 the method includes receiving a beam of modulated coherent light. Step 43-2 includes demodulating and decoding the received beam of modulated coherent light and parsing the data retrieved to determine the purpose and source of the transmission. Step 4B-3 of the method includes gene rating a message locally on the user device having received the beam of modulated coherent light to alert the user thereof of a request for communication from a remote user. For example, the local signal includes at least one of a text message, an email, an audible sound, a vibration and a visual indicator. Step 4B-4 of the method includes prompting the user to reciprocate contact. Step 4B-5 of the method includes determining whether or not the user has chosen to reciprocate the contact. If the user has chosen to reciprocate the contact (yes path, step 4B-5), communication with the remote user is reciprocated using a suitable form of communication (e.g. internet messaging, wireless messaging, phone call, email, etc.). If the user chooses to decline further contact (no path, step 4B-5), the method ends with no further contact. Additionally and/or alternatively, the user may also choose to block any further messages from the remote user that initiated contact.

Figure 5:
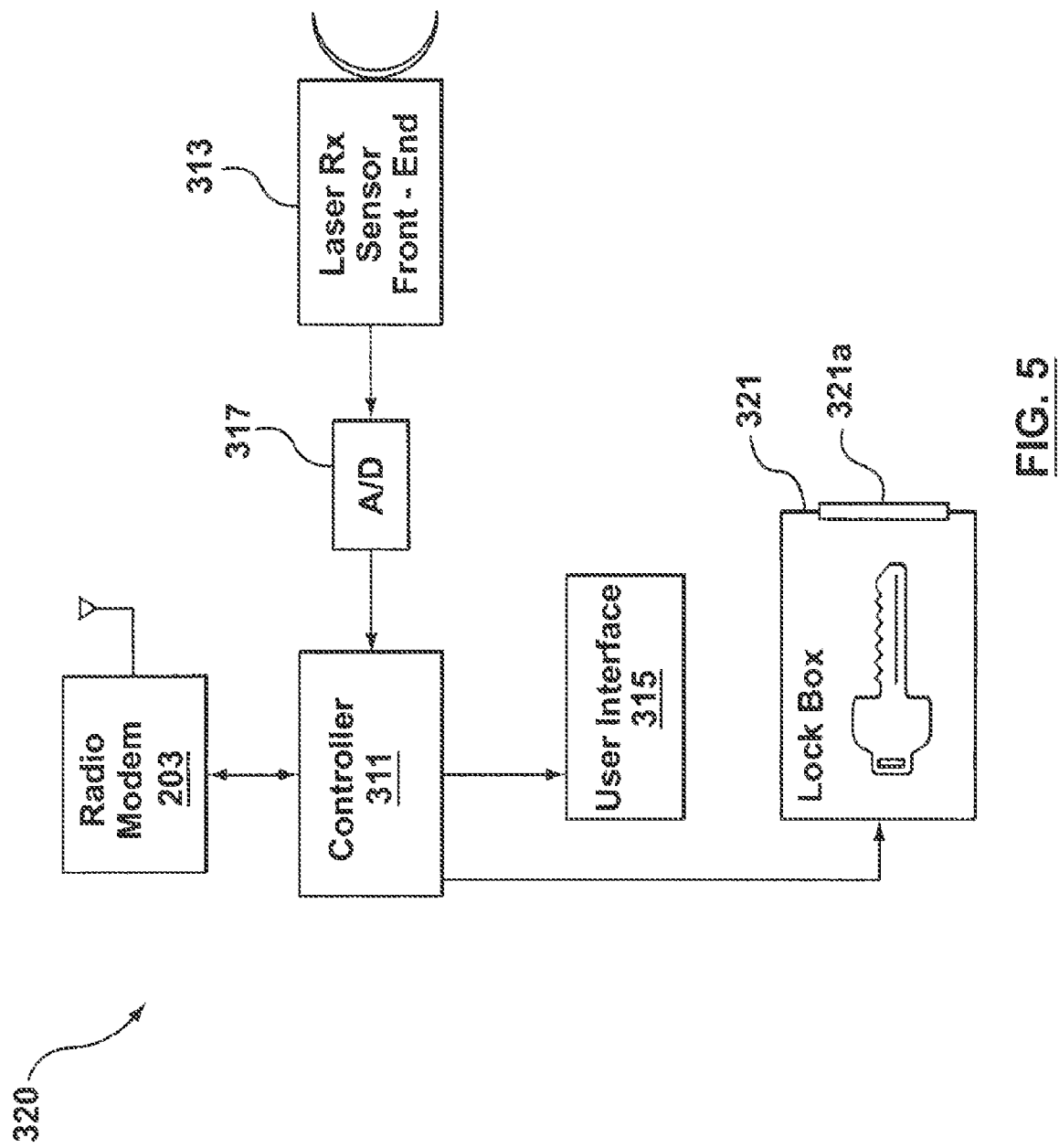
FIG. 5 is a schematic view of a lock box system adapted in accordance with aspects of the invention so as to enable remote user authentication.

FIG. 5 is a schematic view of a lock box system 320 adapted in accordance with aspects of the invention so as to enable remote user authentication. Those skilled in the art will appreciate that the lock box system 320 may be supported by a suitable combination of hardware, software and firmware, in addition to mechanical structures, mechanisms, controllers and packaging. However, only those elements required to describe specific aspects of the invention have been illustrated in FIG. 5. Specifically, the lock box system 320 includes a controller 311, an A/D converter 317, a laser receive sensor front end 313, a user interface 315, a lock box 321 and a radio modem 203.

The laser receive sensor 313 is coupled in series to the A/D converter 317 which is in turn coupled to the controller 311 to provide a down-converted signal thereto. The user interface 315, lock box 321 and the radio modem 203 are also each connected to the controller 311.

The lock box 321 provides a chamber 321b in which an article, such as for example and without limitation, a key 323 or a document. The chamber is accessible through a lockable opening 321a. Traditionally, lockable opening includes a lock that is opened with a key, a combination, biometric information (e.g. finger print scanner or retinal scanner) and the like. However, provided by aspects of the invention the lock box system 320 provides an option to open the lockable opening 321a using a remote authentication process that is facilitated by the use of the radio modem 203 and the laser receive sensor front end 313.

Figure 6:
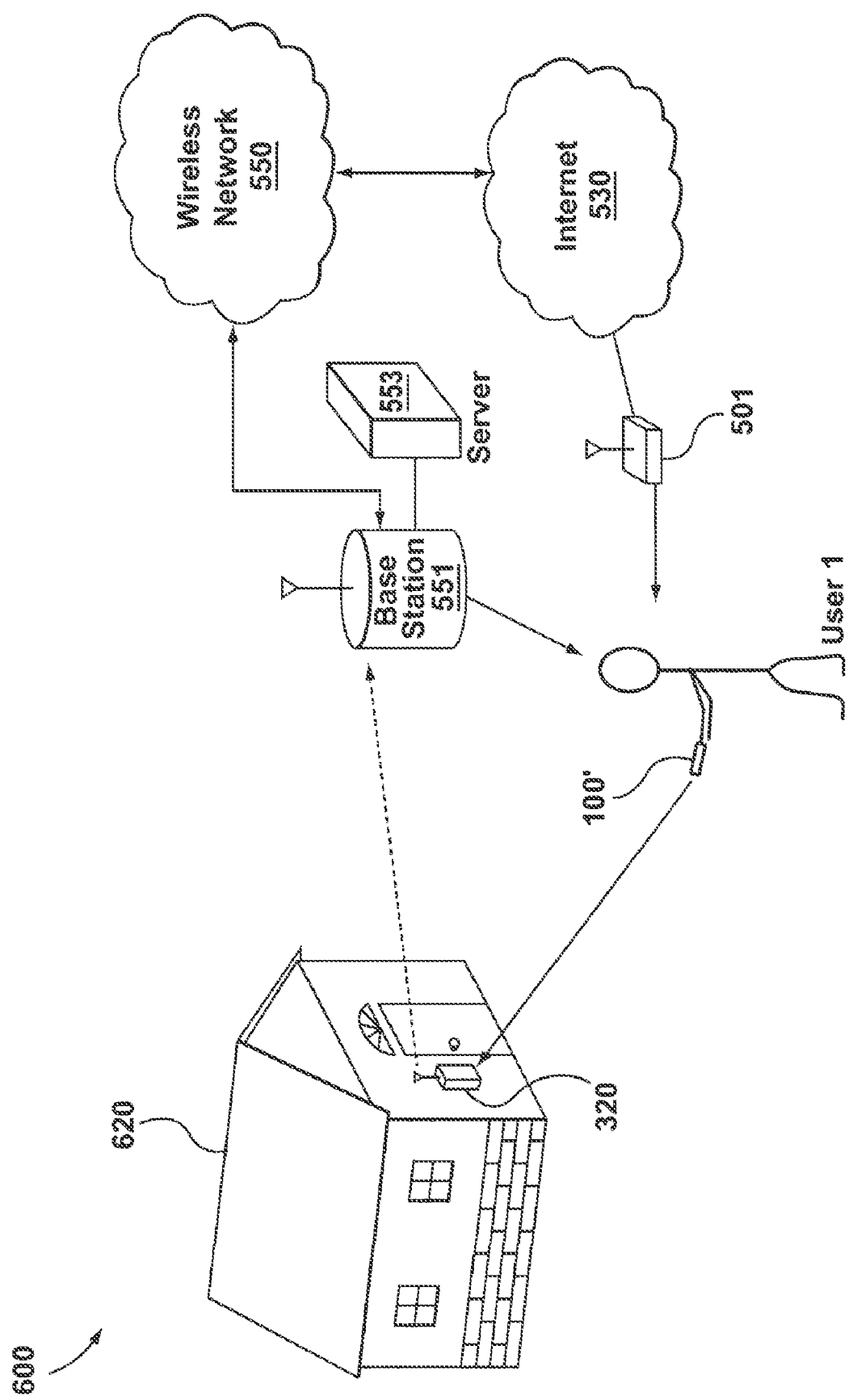
FIG. 6 is a schematic view of an authentication system incorporating the lock box system shown in FIG. 5, in accordance with aspects of the invention.

In order to further illustrate this example embodiment, reference is made to the authentication system 600 utilizing the lock box system 320 in accordance with aspects of the invention. The authentication system 600 depicted in FIG. 6 is provided, without limitation, in the context of the domestic real estate showings. Lock boxes are often used in the real estate market to store a copy of a key for a house that is up for sale. In some cases, the lock box has a combination lock, requiring real estate agents (and the like) to remember to get the combination before leaving the office. However, it is easy to forget a combination for a particular lock box, especially when several houses a day are visited.

In contrast, in accordance with aspects of the present invention, the authentication system 600 utilizes the lock box system 320 shown in FIG. 5. With specific reference to FIG. 6, the lock box system 320 is affixed to or near a house 620. A user, User 1, is provided with a hand held device 100' similar to that described with reference to FIG. 1 above. The authentication system 600 also includes a base station 551 associated with the wireless network 550, and/or a wireless router 501 operably connected to the internet 530 or a private data network. A server 553 is also provided with the base station 551 for storing user information and an implementation of the authentication method described below. In alternative embodiments, the server may not be co-located with the base station 551, but instead may be provided in another location and access via an internet connection or the like.

In operation, the user User 1 utilizes the hand held device 100' to transmit a beam of modulated coherent light towards the lock box system 320. The modulated coherent light carries information about the user User 1 and a request for the lock box to be opened. Additionally and/or alternatively, the modulated coherent light may carry a request for a password or authentication key that opens the lock box. With specific reference to FIG. 5 and FIG. 6, upon receiving and demodulating the modulated coherent light beam from the user User 1, the controller 311 parses the data received from the hand held device 100' and creates a request that is sent to the server 553. To that end, the controller 311 provides the request to the radio modem 203 that communicates the request to the base station 551, which then delivers the request to the server 553. The request sent from the lock box system 320 also includes a lock box identifier (address) so that the authentication implementation running on the server 553 can identify which lock box (i.e. specific house) the request is coming from. An implementation of an authentication method running on the server 553 checks the request for a valid user identification to determine if the request originated from an authorized user (e.g. a registered real-estate agent, subscribing to a respective service including the authentication method). If it is determined that the request did not originate from an authorized user, the authentication method running on the server 553 does not open the lock box 321 or send a message to the hand-held device 100'.

If it is determined that the request originated from an authorized user, the authentication method running on the server 553 sends a message to the hand-held device 100' and/or directly opens the lock box 321. The lock box 321 can be opened remotely by the server 553, by sending a suitable signal to the radio modem 203 of the lock box system 320. Alternatively, a message containing either a password or an authentication key can be sent from the server 553 to the hand held device 100' using one of the base stations 551 of the wireless network 550 and the wireless router 501 operably connected to the internet 530.

Again, because the light beam transmitted from the hand-held device 100' is coherent the risk of it being intercepted is reduced since the light travels only between the hand held device 100' and a target selected by a user.

Additionally and/or alternatively, an implementation of the authentication method may be included within the lock box system 320 itself. Such an embodiment may include computer program instructions defining the authentication method stored in a memory unit (not shown) included with the lock box system 320 and executable by the controller 311. Furthermore, the radio link to a base station would not necessarily be required. Instead, the radio link may be used to send data back to the hand held device 100' directly from the radio modem 203 of the lock box system 320.

Additionally and/or alternatively, the lock box system 320 can be integrated and/or co-located with a real-estate sign. In some such embodiments, the lock box system 320 may also store and provide information about the house (or the like) that it is associated with. An example of using the lock box system 320 in this way will be apparent to those skilled in the art after reviewing the following description with reference to FIG. 7.

Figure 7:
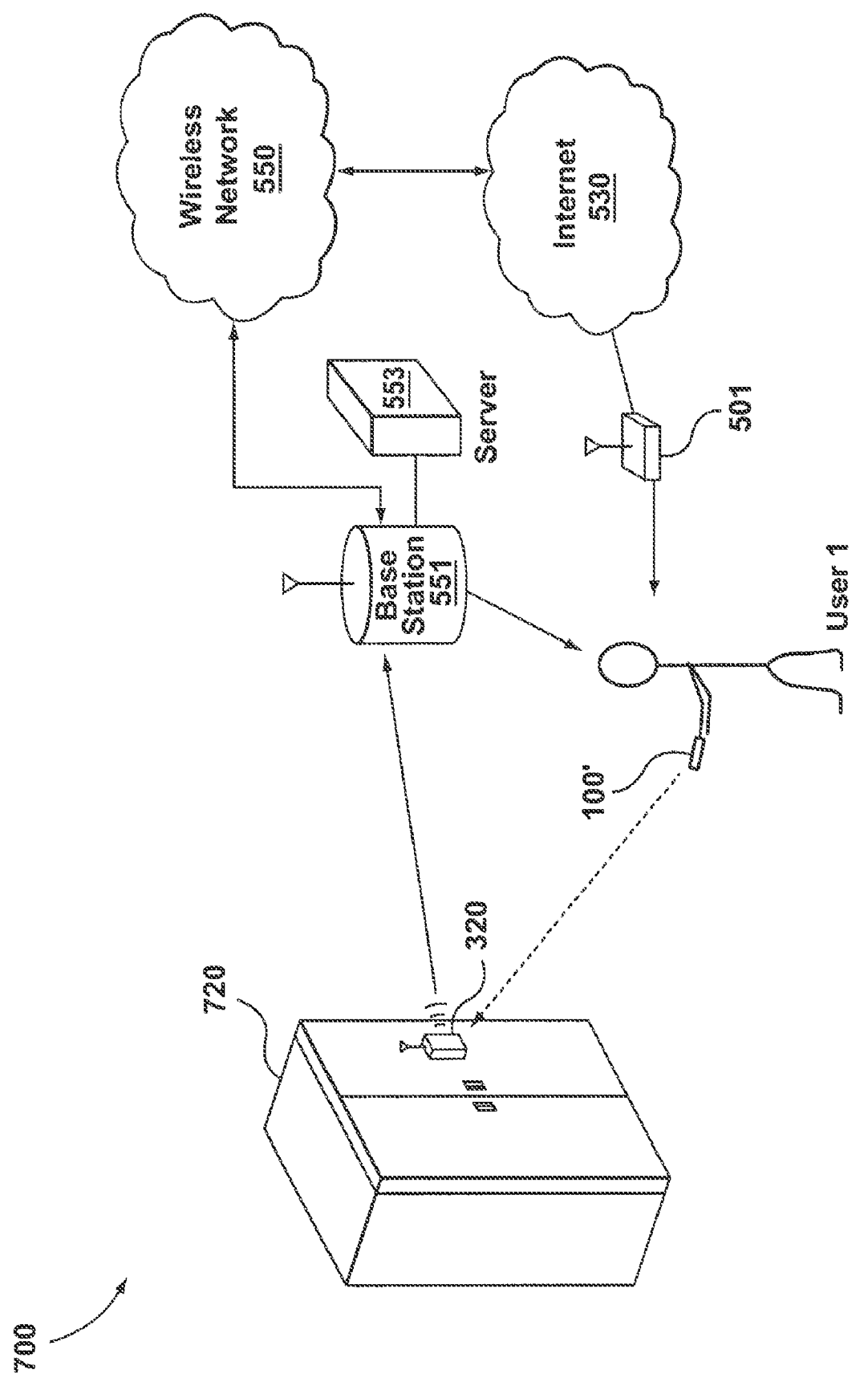
FIG. 7 is a schematic view of an information transfer system provided in accordance with aspects of the invention.

FIG. 7 is a schematic view of an information transfer system 700 provided in accordance with aspects of the invention that is similar to the authentication system 600 shown in FIG. 6. Accordingly, elements common to FIGS. 6 and 7 share common reference indicia. The information transfer system 700 does not necessarily require the same level of security as the authentication system 600 depecited in FIG. 6, and instead has applications such as, without limitation, in the retail environment. For example in a retail environment, a user User 1 may wish to obtain more information about a particular product, a refrigerator 720. In accordance with aspects of the invention, the refrigerator 720 can be provided with a device 320' for transferring information about the product to the user User 1. The device 320' is similar to the lock box system 320, with the exception that it does not need the lock box 321

In operation, the user User 1 seeking information about the refrigerator 720 transmits a modulated coherent light beam towards the device 320'. The device 320' receives and demodulates the modulated coherent light beam, which is carrying information about the user User 1 (e.g. email address, phone number, etc.) and a request for information. The device 320' employs a radio modem (e.g. radio modem 203 in FIG. 5) to transmit the request to the server 553. The device 320' adds to the request a product identifier so that software running on the server 553 can find the information about the product the user is concerned with. The software on the server 553 searches a database of product information containing information about various products to find the information requested. Once the information is found, the software running on the sever 553 sends the information to the hand-held device either over the internet or using the wireless network 551. In such embodiments, the modulated coherent light beam contains contact information for the user, such as, for example and without limitation, an email address, a phone number, a MAC address, etc. The server 553 may respond automatically with an email, a text message, a voice message or the like providing the details of the product to the user.

Additionally and/or alternatively, product information may be stored within the device 320'. Furthermore, the radio link to a base station would not necessarily be required. Instead, the radio link may be used to send data back to the hand held device 100' directly from the radio modem 203 of the device 320'.

Figure 8:
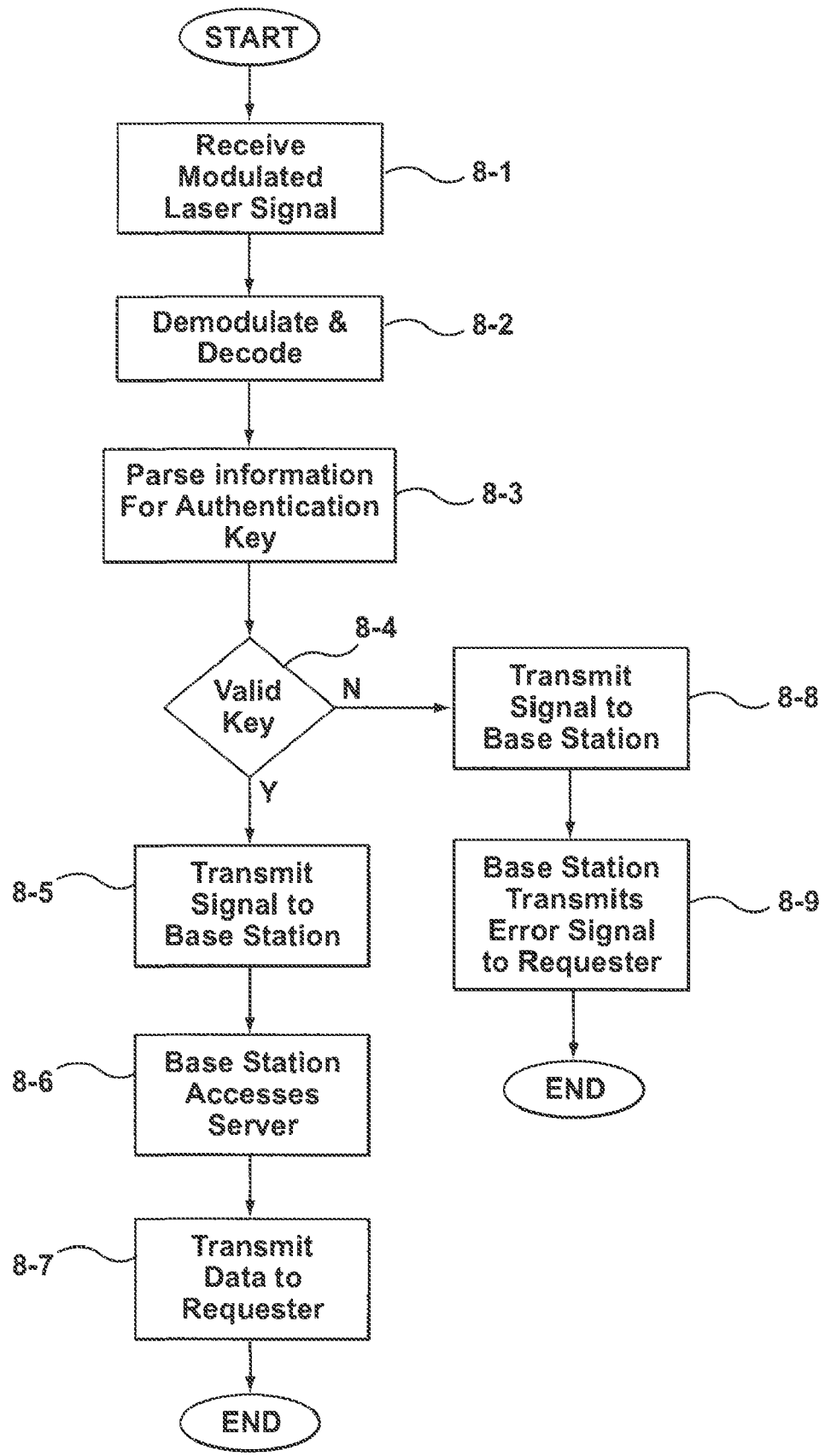
FIG. 8 is a flow chart illustrating method steps for securely transferring information in accordance with aspects of the invention.

FIG. 8 is a flow chart illustrating method steps for securely transferring information in accordance with aspects of the invention. Starting at step 8-1 the method includes receiving a beam of modulated coherent light. Step 8-2 includes demodulating and decoding the received beam of modulated coherent light and step 8-3 includes parsing the data retrieved to determine the purpose and source of the transmission and to identify an authentication key or password included in the transmission. A local message to alert a user is generally not required because this particular method is intended for scenarios identical or similar to those depicted in FIGS. 6 and 7.

Step 8-4 of the method includes determining if a valid authentication key has been provided in the received modulated coherent light beam. If a valid key has been provided (yes path, step 8-4), the method proceeds to step 8-5. Alternatively, if a valid key was not provided (no path, step 84), the method proceeds to step 8-8.

At step 8-5 the method includes transmitting a request to a base station or equivalent node in a wireless communication network, the internet or private data network. Subsequently, at step 86, the bases station accesses the server and at step 8-7 information requested is transmitting to the requester that sent the modulated coherent light beam.

At step 8-8, the method includes transmitting a signal to the base station or equivalent node in a wireless communication network, the internet or private data network. In turn, at step 8-9, the method includes transmitting an error signal to the requester.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention and numerous modifications and variations of the present invention are possible in light of the above disclosure.

The invention claimed is:

1. A system for remotely establishing data communication between a first device and a second device, the system comprising:

a device interface, the device interface having a first output and a first input, wherein the first output is connectable to a camera mount controller to provide a control signal for directing the operation of the camera mount controller, and wherein the first input is connectable to receive a data input from a remote first user;

an optical modem for transmitting data on a coherent light beam in a direction that is selectable with the first device;

a memory for storing data within the first device; and a controller connectable to the optical modem, the memory and the data interface, the controller having computer usable program code for transmitting data from the first device to the second device, the computer usable program code including program instructions for:

parsing signals received by the first device through the device interface;

determining whether a signal received is for directing the operation of the camera mount controller or initiating communication with the second device;

if the signal received is for directing the operation of the camera mount controller, transmitting a control signal for directing the operation of a camera mount controller; and if the signal received is for initiating communication with the second device, modulating selected data onto a coherent light beam with the optical modem wherein the selected data identifies the first device sufficiently to permit communication between the second device and the first device using a means other than the coherent light beam;

wherein the second device is configured to be able to use the selected data to carry out at least one action selected from the group consisting of: communicate with the first device using a means other than the coherent light beam, ignore the first device, and block further transmissions from the first device.

2. A system according to claim 1, wherein the computer usable program code further comprises:

initially transmitting an unmodulated coherent light beam for a first duration to allow a user to aim the coherent light at the second device;

and transmitting the selected data from the optical modem after the first duration.

3. A system according to claim 1, wherein the selected data modulated onto the coherent light beam is one of a text message, a phone number, an email address, a Media access Control (MAC) address suitable for a wireless communication link and a wireless session identifier.

4. A system according to claim 1, further comprising a camera, the camera having a network connection to provide real-time video data to a user through the network connection.

5. A system according to claim 4, wherein the camera is further connectable to receive data signals from the network connection.

6. A system according to claim 5, wherein the network connection is one of an ethernet connection, a USB (Universal Serial Bus) port and a wireless modem.

7. A system according to claim 6, wherein the camera is integral with the device and internally connectable to the device interface.

8. A system according to claim 4, further comprising a camera mount controller serving as an interface for a mechanical system for positioning the device so as to direct the field of view of the camera and a coherent light beam transmitted from the optical modem, wherein the path of the coherent light beam represents a data path between the device and a target selected by the user.

9. A system according to claim 8, further comprising a movable camera mount serving as the mechanical system for positioning the device.

* * * * *